United States Patent [19]
Mechulam et al.

[11] 3,954,041
[45] May 4, 1976

[54] MILITARY OBSERVATION POST SUCH AS A GUN TURRET

[75] Inventors: André Mechulam, Tarbes; Bruno M. Saintours-Payerne, St. Etienne; Guillaume A. Gay-Chatain, St. Etienne; Paul R. Montjallard, St. Etienne, all of France

[73] Assignee: Etat Francais, Paris Armees, France

[22] Filed: Mar. 15, 1974

[21] Appl. No.: 451,602

[30] Foreign Application Priority Data
Mar. 30, 1973 France .................. 73.11480

[52] U.S. Cl. .................. 89/36 K; 297/345
[51] Int. Cl.² .................. F41H 5/20
[58] Field of Search ............ 89/36 K, 37.5 R, 40 B; 248/376, 421; 297/345, 346, 347, 349

[56] References Cited
UNITED STATES PATENTS

| | | | |
|---|---|---|---|
| 549,163 | 11/1895 | Spence................ | 297/345 |
| 1,935,491 | 11/1933 | Wallis................ | 89/37.5 R |
| 2,450,541 | 10/1948 | Chase et al. ........ | 89/36 K |
| 2,453,208 | 11/1948 | Duplessis............ | 297/345 |
| 3,625,563 | 12/1971 | Dickinson et al..... | 297/345 |

*Primary Examiner*—Stephen C. Bentley
*Attorney, Agent, or Firm*—Haseltine, Lake & Waters

[57] ABSTRACT

An observation post such as a turret having an observation opening allowing passage of the head of an operator therethrough, the opening being preferably closable by an armored hatch cover. An external viewing device is mounted outside the turret and is employed by the operator with his head disposed in the observation opening, and an internal viewing device is mounted inside the turret below the external viewing device and parallel thereto, the internal viewing device being of greater precision and having a reduced field of view as compared to the external viewing device. The viewing devices are coupled together to be maintained parallel to one another. A set is mounted in the turret for the observer and is disposed substantially parallel to the observation opening, the seat being connected to the support structure of the equipment by a deformable kinematic system by which the seat can be displaced between a maximum elevated position in which the eyes of the seated operator are at the level of the external viewing device and a minimum lowered position in which the eyes of the operator, in the same seated attitued, are at the same level as the internal viewing device. A locking mechanism serves for locking the seat in these two extreme positions, the locking mechanism including an actuator acted on by the operator for releasing the locking mechanism to allow the unlocked seat to be lowered from the elevated position, under the weight of the operator seated in the seat, against the action of an elastic system, which acts to raise the seat from the extreme lowered position when the weight of the operator has been released from the seat and the locking mechanism is unlocked.

9 Claims, 4 Drawing Figures

MILITARY OBSERVATION POST SUCH AS A GUN TURRET

BACKGROUND

The invention relates to military observation posts (generally, but not necessarily, constituted by a turret) equipped with two superimposed sighting devices, namely a rough external sighting device and an internal precision sighting device having a reduced field of view compared to the external sighting device, said internal sighting device being generally utilized by the observer in the final phase of pursuit of an objective which has been initially sighted by the external sighting device.

It is noted that the expression "military equipment" is used hereafter in a very general sense and it relates to equipment of fixed type, such as, for example, observation blockhouses and fortresses, as well as mobile equipment such as vehicles (ground, naval or aerial) equipped with an observation post generally in the form of a turret or a bubble (a turret of small diameter).

Furthermore, the military equipment according to the invention can be a simple observation post or, in the more general case, it can include at least one gun (automatic cannon or machine gun) operated by the observer.

In this domain of relatively wide utilization of military equipment (fixed or mobile, with or without a gun) the invention is particularly but not exclusively directed to armored vehicles with a gun turret equipped with an external rough sighting device and an internal precision sighting device, the gun carried by the turret (for example, mounted exteriorly on its roof) being then controlled in angle of elevation from the interior of the turret. Military ground vehicles of this type can be combat vehicles such as tanks, armored cars etc, reconnaissance vehicles or personnel carriers (wheeled or tracked).

For military equipment of this type, it is important that the observer, once that he has sighted an objective in the external rough viewing device can rapidly again find this objective in the internal precision sighting device and perfect his observation mission or even a firing mission with the aid of said internal sighting device.

To this effect, it has already been proposed to correlate the aiming and elevation movements of the external and internal sighting devices, particularly in the case of a turret of an armored car carrying a gun and the two superimposed sighting devices (external and internal viewers), wherein the sighting devices are coupled to follow the aiming and elevation movements of the gun such that the optical axes of the two sighting devices and the axis of the gun remain constantly parallel.

However, this arrangement of correlation of the aiming of the internal and external sighting devices does not afford, in military equipment of the type described, entirely satisfactory results from the point of view of convenience, rapidity and precision for the operator in going from the work position at the external viewer to the work position at the internal viewer.

In practice, the observer generally utilizes the external viewer while standing up with his head disposed in an observation opening and therefore when he is to utilize the internal viewer, he must sit down within the observation post in an attitude entirely different from the standing position which he previously assumed. Moreover, rapid change from the standing position to the seated position is generally prevented by the small size and complexity of the observation post and by general equipment carried by the observer.

Furthermore, during the greatest portion of the mission (travel advance, reconnaissance, sighting of targets, etc.) the observer is standing which is uncomfortable and tiring, particularly in the case of a ground vehicle which travels on rough terrain.

All of these disadvantages mentioned above prevent the observer from accomplishing his mission under the best conditions and with maximum efficiency.

SUMMARY OF THE INVENTION

An object of the invention is to provide apparatus which avoids the above disadvantages and to this effect to provide equipment of the above type in which the observer can easily and rapidly go from the position of observation using the external viewer to the position of observation using the internal viewer without substantial change in his body position, the latter being relatively comfortable for both observation positions.

The military equipment according to the invention, such as an armored car, comprises an observation post, for example, a turret having an observation opening allowing passage of the head of an operator therethrough, said opening being preferably closable by an armored hatch cover, an external viewing device mounted outside the turret and employed by the operator with his head disposed in the observation opening, an internal viewing device inside the turret below the external viewing device and parallel thereto, said internal viewing device being of greater precision with a reduced field as compared to the external viewing device, means for maintaining the viewing devices parallel to one another, a seat in the turret for the operator disposed substantially parallel to the observation opening, the military equipment being characterized in that the seat is connected to the structure of the equipment by a support means including a deformable kinematic system by which the seat can be displaced between a maximum elevated position in which the eyes of the seated operator are at the level of the external viewing device and a minimum lowered position in which the eyes of the operator seated, in the same seated attitude, are at the same level as the internal viewing device, a locking means being provided for locking the seat in these two extreme positions, said locking means including an actuator acted on by the operator for releasing the locking means to allow the unlocked seat to be lowered from the elevated position, under the weight of the operator seated in the seat, against the action of a biassing means, which is capable of raising the seat from the extreme lowered position when the weight of the operator has been relieved from the seat and the locking means is unlocked.

Hence, the operator can effect all parts of his mission without danger (reconnaisance, advancing travel, sighting of distant objects, such as aircraft) while remaining seated on the seat in elevated observation position and using either direct viewing or the external viewing device. In case of danger, or when the operator wishes to use the internal precision viewing device, the seat is unlocked and rapidly and automatically descends to the lowered position in which the eyes of the operator will be situated, without his having changed his seated position, at the level of the internal viewing device, and at which due to the parallelism of the two viewing devices, any object previously sighted in the external viewing device will appear in the internal viewing device.

After the operations have been completed at the internal viewing device, the operator can return the seat to the elevated observation position by relieving his weight on the seat and unlocking the locking means so that the seat will automatically ascend under the action of the biassing means and be automatically locked by the locking means when it reaches the elevated position. The operator can now resume his seated position on the thus locked seat.

Thus not only will the observer be in a comfortable seated position in both work positions (elevated and lowered observation positions) but he will travel rapidly and without change in his seating position from the elevated to the lowered position with the greatest chance of viewing in the internal viewing device an object previously sighted in the external viewing device. This will permit firing a gun under the best conditions of accuracy when the observation post is furnished with a gun, as is usually the case.

When the observation post carries a gun, the external and internal viewing devices are advantageously coupled to the mechanisms for adjusting the direction of aim and the angle of elevation of the gun such that when the observer leaves the external viewing device and tries to capture the image of a previously sighted object in the internal viewing device, the gun is at least already approximately pointed at the object.

Preferably, the observation post is constructed as a turret whose rotational movements are effected by a control member in the turret for aiming the gun, the viewing devices traveling with the turret and thereby pointing in the same direction as the gun, the angle of elevation of the gun being effected by a second control member in the turret, the viewing devices being so controlled that they follow the elevational movements of the gun.

The control members are so disposed in the turret to be easily accessible to the seated observer in either of the two work positions.

Preferably, the deformable kinematic system is connected to the seat and to the structure of the observation post and the biassing means such that displacements at the point of attachment of the biassing means are amplified by the kinematic system, thereby permitting reduction in the free space provided for the biassing means.

The biassing means can advantageously be constructed as any pre-stressed elastic system such as a helicoidal spring, or a pressurized pneumatic cushion in a bellows or the like, the elastic system serving as a simple energy accumulator which does not require, during its operation, any consumable source of energy and it is effectively energized automatically by the weight of the observer each time that he remains seated on the seat when it lowers from the elevated to the lowered position.

The elastic system and the kinematic system can be carried by a common element, such as a mast fixed to the turret for rotation therewith.

The seat is preferably provided with a means for adjusting the relative height thereof in the work positions to the conformation of the particular observer so that his eye level will correspond to the axes of the viewing devices in the respective work positions.

The locking means preferably comprises an actuator pedal operated by the observer who remains seated when it is desired to go from the elevated observation position to the lowered observation position. The pedal is positioned to be operated by the observer when he has raised himself slightly from the seat when he wishes to go from the lowered observation position to the elevated observation position.

DETAILED DESCRIPTION

Figure 1:
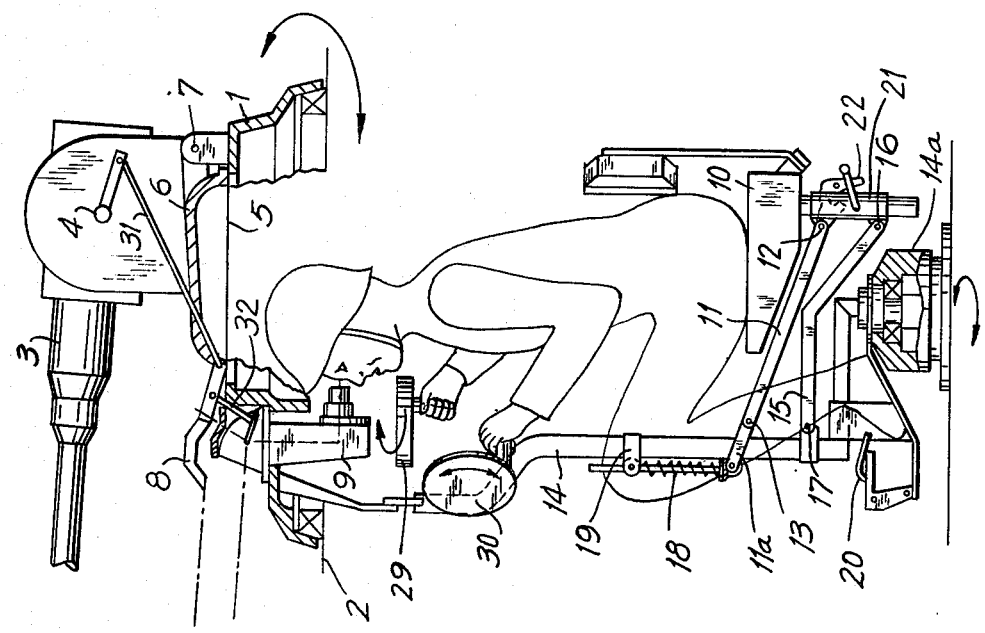
FIG. 1 is a schematic side elevational view partly in section of a turret of an armored car according to the invention, showing an observer in an elevated observation position.
Figure 2:
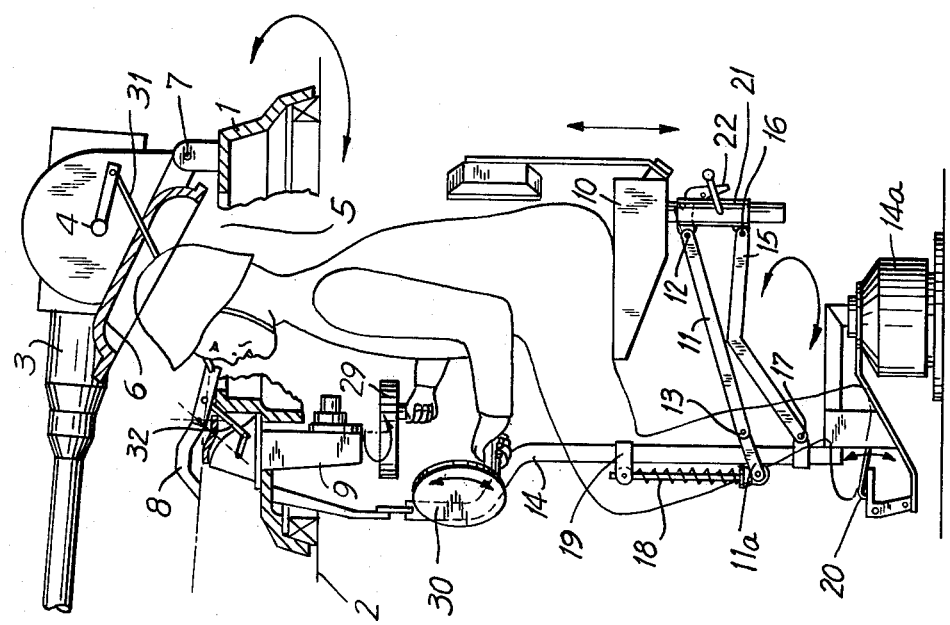
FIG. 2 is a view similar to FIG. 1 but with the observer in a lowered observation position.
Figure 3:
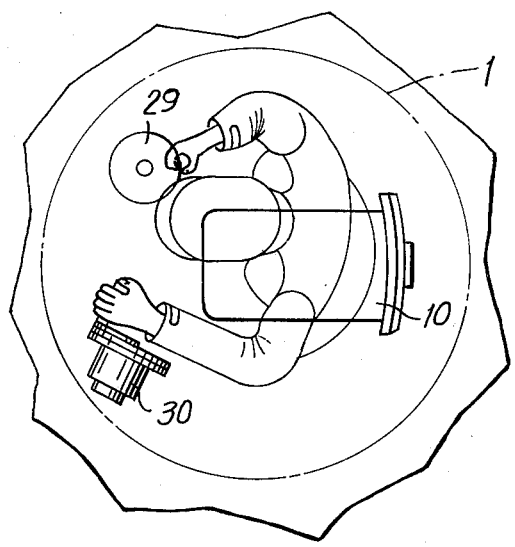
FIG. 3 is a top plan view of the turret.

Referring to FIGS. 1–3, therein is seen a rotatable turret 1 situated at the upper portion of an armored car 2, the turret being adapted to support an externally mounted gun 3 which follows the rotational movements of the turret and is connected to a mechanism for controlling the range of the gun by pivotally moving the gun around a horizontal axle 4.

The turret is provided at its upper portion with an observation opening 5 which can be closed, in an alert condition, by an armored hatch cover 6 pivotally mounted on an axle 7 disposed rearwardly of an observer in an observation position. The turret is equipped with an external viewing device 8 of large field for rough viewing purposes, said device being mounted above the level of observation opening 5, and an internal viewing device 9, more precise than viewing device 8, and of reduced field, and constructed for example with prisms, said viewing device 9 being mounted at a level below that of viewing device 8.

The observer can occupy two observation positions within the interior compartment of the turret, namely an elevated position in which the observer's head is disposed in opening 5 after the cover 6 has been opened (position in FIG. 1) and a lowered position in which the observer's eye is at the level of the internal viewing device 9, the cover 6 being closed, as seen in FIG. 2.

In accordance with the invention, there is provided in the interior of the turret 1 an observation seat 10 extending substantially parallel to the opening 5, the seat being connected to the turret by a kinematic system by which the seat is movable between a raised position (corresponding to the level of the elevated position of observation illustrated in FIG. 1) and a lowered position (corresponding to the level of the lowered position of observation in FIG. 2).

The kinematic system connecting seat 10 to the turret 1 is constituted by a deformable quadrilateral linkage comprising an upper arm 11 articulated at one end on an axle 12 secured to the seat 10 and articulated at its other end on an axle 13 secured to a mast 14 fixed to the turret, the mast being rotatably mounted at its base in a bearing 14a fixed at the floor of the vehicle and coaxial with the turning axis of the entire turret 1 such that mast 14 and the members carried thereby (particularly seat 10) rotate coaxially with the turret.

The quadrilateral linkage further comprises a lower arm 15 which is bent to minimize space requirements, the arm 15 having one end articulated on an axle 16 secured with seat 10 and an opposite end articulated on an axle 17 secured to mast 14.

The arm 11, includes at the end remote from seat 10, a small link 11a (much shorter than the length of the arm 11, to produce a multiplication effect of displacement) the free extremity of link 11a being subjected to the action of a precompressed, helicoidal spring 18 interposed between this free extremity and an abutment 19 fixed on the mast 14. The precompressed spring acts as a biassing means and applies a sufficient force to effect the raising of the seat 10 and deformation of the quadrilateral linkage, said force, however, being insufficient to overcome the additional weight of the observer when he is seated on seat 10.

A locking means with a control pedal 20 is provided so that when the pedal is activated, the locking means is released to allow the seat to travel from one position to another as will be explained more fully later.

Figure 4:
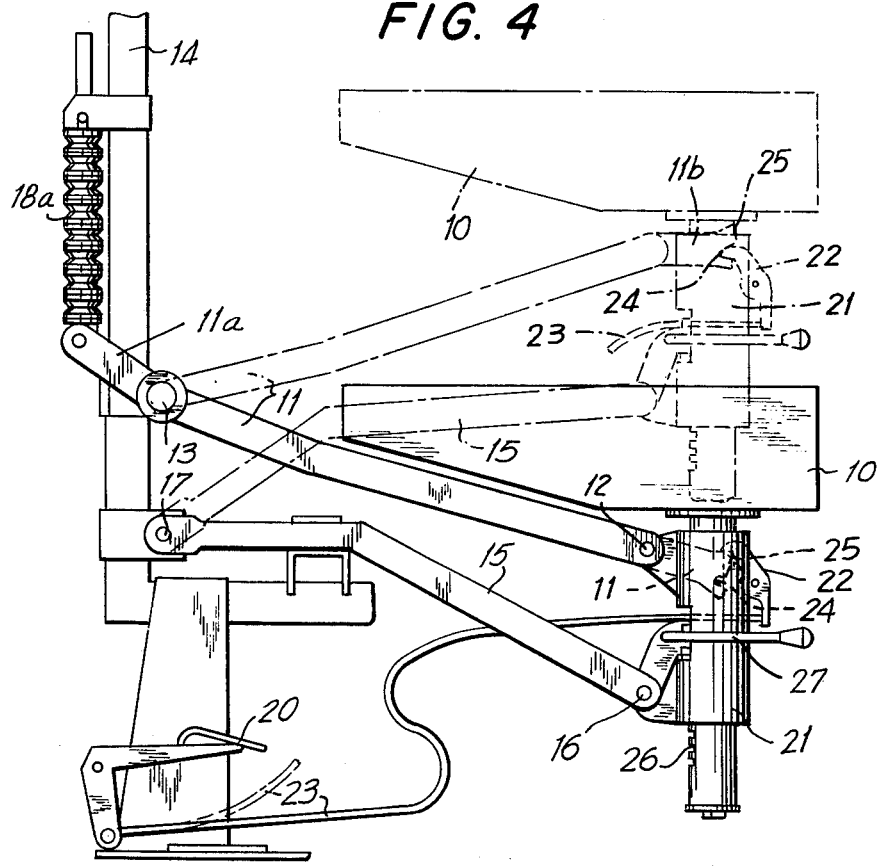
FIG. 4 shows, in side elevation and on enlarged scale, a modified portion of the apparatus for securing a seat in the two observation positions.

Reference is next made to FIG. 4 for a detailed explanation of the seat structure illustrated thereat.

The seat 10 is supported by a sleeve 21 to which are secured axles 12 and 16 of the deformable kinematic system. The sleeve 21 carries a pivotal pawl 22 operated by a Bowden cable 23 connected to pedal 20, the pawl being engageable with either a notch 24 provided in the end of a projection 11b of arm 11 or an abutment 25 formed on the end of projection 11b above notch 24. The notch 24 is utilized for locking the seat in its upper position (as shown in chain-dotted lines) and the abutment 25 is utilized for locking the seat in its lowered position as shown in dotted lines.

In FIG. 4, the helicoidal spring 18 has been replaced be a bellows 18a filled with a pneumatic cushion serving the same function as the spring.

The seat has a vertical, threaded stem 26 fixed thereto, the stem extending with clearance through the sleeve. Mounted on the sleeve is a locking device for engaging the threads on the stem 26, to lock the sleeve 21 on the stem in an adjusted position for the seat. The locking device includes a movable handle 27 which when in operative position engages the threads and immobilizes the sleeve 21 on stem 26.

A control wheel 29 is mounted within the turret for controlling the direction of aim of the turret (and thereby the aim of the gun mounted thereon) and a control wheel 30 serves to regulate the angle of elevation of the gun 3, said control wheels being readily accessible to the operator in either the elevated or lowered positions of the seat 10.

A linkage 31 connects the gun cradle and the external sighting device 8 so that the sighting device 8 will follow the elevational movements of the gun.

A parallelogram linkage 32 maintains the axis of the internal viewing device 9 parallel to that of the external viewing device 8.

The apparatus is controlled by the operator as follows.

When the operator is seated on seat 10 in an elevated observation position as shown in FIG. 1 and he wants to go rapidly to the lowered position to continue pursuit of an object with the aid of the internal sighting device 9, after previously sighting the object in external sighting device 8, the operator steps on pedal 20 which releases pawl 22 and allows the seat to lower under the weight of the operator against the action of the counteracting system of spring 18 or bellows 18a, which cushions the descent. Either before or when the operator is at the lowered observation position as shown in FIG. 2, the operator releases pedal 20 and the nose of pawl 22 extends into a position above the abutment 25 and thus locks the seat in lowered position. If the operator now wishes to re-assume the elevated position, he lifts his weight off seat 10 and steps on pedal 20 whereby the seat will be raised under the action of spring 18 or bellows 18a. Either before or when the seat has reached its raised position corresponding to the elevated observation position, the operator releases pedal 20 whereby the nose of pawl 22 engages in notch 24 and locks the seat at its raised position whereafter the operator can now be seated again on the thus locked seat.

It is thus seen that the apparatus permits the operator to work in a seated position both at the elevated observation position with the cover 6 open while utilizing the external viewing device 8 (FIG. 1) as well as in the lowered observation position with the cover 6 closed while utilizing the internal viewing device 9. It is possible for the operator to go rapidly from the elevated position to the lowered position without changing his seating position and while keeping his hands on the control wheels and rapidly shifting his sight from the external viewing device 8 to the internal viewing device 9 to afford substantially continuous viewing of a sighted object.

Numerous modifications and variations of the disclosed embodiments will become evident to those skilled in the art withoug departing from the scope and spirit of the invention as defined in the appended claims.

What is claimed is:

1. A military observation post comprising a structure defining an inner compartment for an operator, said structure having an observation opening allowing passage of the head of the operator therethrough, an external viewing device mounted on said structure outside said compartment, an internal viewing device mounted within said compartment parallel and below said external viewing device and of greater precision than the external viewing device, a seat in said compartment on which the operator can be seated, support means connecting said seat to said structure for movement betweeen an elevated position at which the operator is at the level of the external viewing device and a lowered position at which the operator is at the level of the internal viewing device, and locking means actuated by the operator from within the compartment for locking the seat in said positions and for selectively unlocking the seat to permit the seat to travel to the other position, said support means including a mast mounted on said structure, biassing means on said mast for urging the seat from the lowered to the raised position when the locking means is unlocked and the weight of the observer is relieved from the seat, said seat being lowered from the raised to the lowered position by the weight of the observer and in opposition by the biassing means when the locking means is unlocked, whereby in going from the raised to the lowered position the operator remains in seated position on the seat, said locking means comprising a foot pedal supported within said compartment in a position to be actuated by a foot of the seated operator in the elevated position of the seat, said support means comprising a quadrilateral linkage including a pair of arms, one arm being connected to said seat and to said mast, the other arm being connected to said seat and to said biassing means, the connection of said other arm to the biassing means being displaceable during movement to the seat and constraining such movement of the seat to be substantially vertical between said parallel viewing devices.

2. A military observation post as claimed in claim 1 comprising a gun mounted on said structure for pivotal movement to vary the angle of elevation of the gun, and means connecting said gun and said viewing devices to cause the viewing devices to follow the angular movements of the gun.

3. A military observation post as claimed in claim 2 wherein said structure comprises a turret in which said compartment is formed and on which said gun and external viewing device are supported.

4. A military observation post as claimed in claim 3 wherein said turret is rotatable and further comprising a first control wheel in said compartment controlling rotation of said turret and a second control wheel in said compartment controlling the angle of elevation of said gun.

5. A military observation post as claimed in claim 1 wherein said linkage further includes means for amplifying the force applied by the biassing means.

6. A military observation post as claimed in claim 1 wherein said one of said arms is deformed to minimize space utilization of said quadrilateral linkage.

7. A military observation post as claimed in claim 1 wherein said structure comprises a rotatable turret in which said compartment is formed, said mast being fixed in said turret for movement therewith.

8. A military observation post as claimed in claim 1 wherein said support means includes means for adjusting the relative height of the seat in said respective positions.

9. A military observation post as claimed in claim 1 comprising hand control means in said compartment operated by the hands of said operator for controlling the operation of the observation post, said hand control means being positioned in the compartment to be operated by said operator both in the raised and lowered positions of the seat such that the operator can remain seated while the seat goes from the raised to the lowered position after actuation of the foot pedal while the operator keeps his hands on the hand control means.

* * * * *